United States Patent
Scherrer et al.

(10) Patent No.: US 10,138,733 B2
(45) Date of Patent: Nov. 27, 2018

(54) PROCESS FOR PRODUCING A TURBINE ROTOR

(71) Applicant: BorgWarner Inc., Auburn Hills, MI (US)

(72) Inventors: Frank Scherrer, Frankenthal (DE); Menno Roder, Kirchheimbolanden (DE); Gerald Schall, Bobenheim-Roxheim (DE); Juergen Strelbitski, Orbis (DE); Michael Loewenberg, Weierhof/Bolanden (DE); Stefan Eisinger, Bornheim (DE); Adnan Adilovic, Darmstadt (DE); Dominik Kuss, Weisenheim am Berg (DE)

(73) Assignee: BorgWarner Inc., Auburn Hills, MI (US)

( * ) Notice: Subject to any disclaimer, the term of this patent is extended or adjusted under 35 U.S.C. 154(b) by 487 days.

(21) Appl. No.: 14/437,280

(22) PCT Filed: Oct. 22, 2013

(86) PCT No.: PCT/US2013/066014
§ 371 (c)(1),
(2) Date: Apr. 21, 2015

(87) PCT Pub. No.: WO2014/070509
PCT Pub. Date: May 8, 2014

(65) Prior Publication Data
US 2015/0275672 A1 Oct. 1, 2015

(30) Foreign Application Priority Data
Nov. 2, 2012 (DE) .......................... 10 2012 021 581

(51) Int. Cl.
*B23K 1/005* (2006.01)
*F01D 5/02* (2006.01)
(Continued)

(52) U.S. Cl.
CPC ............ *F01D 5/025* (2013.01); *B23K 1/0056* (2013.01); *B23K 1/18* (2013.01); *B23K 15/06* (2013.01);
(Continued)

(58) Field of Classification Search
CPC ..... F01D 5/025; F04D 29/266; B23K 1/0056; B23K 1/203; B23K 1/18; B23K 15/04; B23K 15/06; B23K 2201/001
See application file for complete search history.

(56) References Cited

U.S. PATENT DOCUMENTS 3,958,739 A * 5/1976 Wicker .................. B23K 15/04
219/121.13
6,291,086 B1 9/2001 Nguyen-Dinh
(Continued)

FOREIGN PATENT DOCUMENTS

DE 102009036715 A1 * 3/2010 ........... B23K 1/0056
JP 2002011581 A * 1/2002

OTHER PUBLICATIONS

International Search Report and Written Opinion dated Jan. 21, 2014, in International Application No. PCT/US2013/066014.

*Primary Examiner* — Justin Seabe
(74) *Attorney, Agent, or Firm* — Eric L. Doyle; Stephan A. Pendorf; Patent Central LLC

(57) ABSTRACT

A process for producing a turbine rotor (1), which has, as joining partners, a turbine wheel (2) made of TiAl and a shaft (3) produced from steel, with the following process steps: providing the turbine wheel (2); providing a solder; providing the shaft (3); and connecting the turbine wheel (2) and (Continued)

the shaft (3) by electron beam soldering by means of an electron beam (5).

4 Claims, 1 Drawing Sheet

(51) Int. Cl.
    *F01D 5/06*           (2006.01)
    *B23K 1/18*           (2006.01)
    *B23K 15/06*         (2006.01)

(52) U.S. Cl.
CPC .......... *F01D 5/063* (2013.01); *F05D 2220/30* (2013.01); *F05D 2220/40* (2013.01); *F05D 2230/233* (2013.01); *F05D 2230/238* (2013.01); *F05D 2230/60* (2013.01); *F05D 2240/24* (2013.01); *F05D 2240/60* (2013.01)

(56) References Cited

U.S. PATENT DOCUMENTS

| | | | |
|---|---|---|---|
| 7,043,818 B2 * | 5/2006 | Gustafsson | B60B 35/166 |
| | | | 29/428 |
| 2004/0057834 A1 | 3/2004 | Shimizu | |
| 2005/0036893 A1 | 2/2005 | Decker | |
| 2006/0067824 A1 * | 3/2006 | O'Hara | F01D 5/026 |
| | | | 416/170 R |
| 2007/0119908 A1 | 5/2007 | Renaud et al. | |
| 2010/0297468 A1 * | 11/2010 | Hecht | B23K 35/001 |
| | | | 428/615 |
| 2011/0091324 A1 | 4/2011 | Holzschuh | |

* cited by examiner

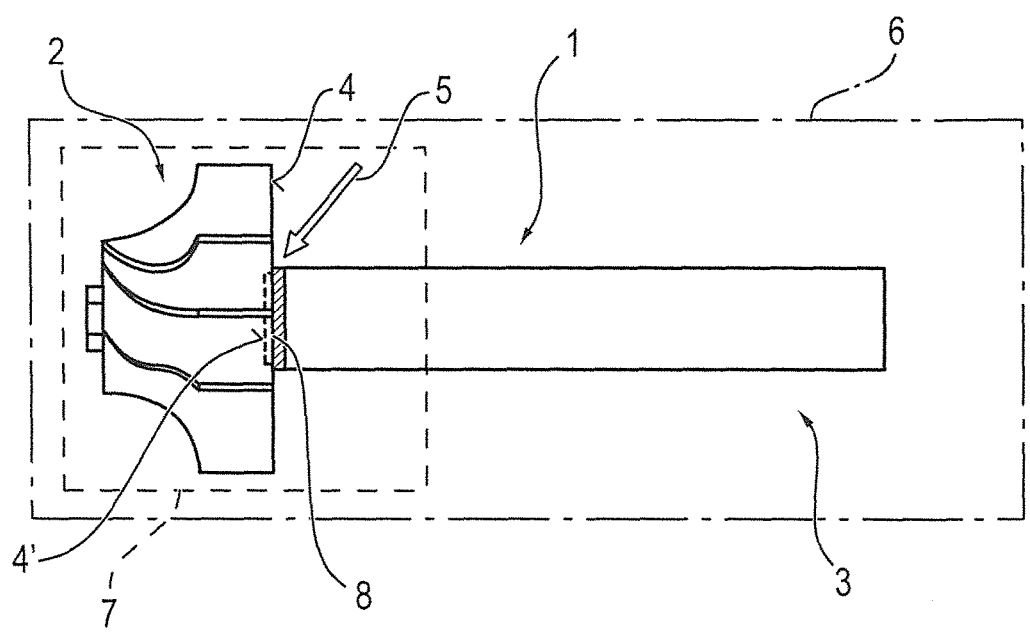

PROCESS FOR PRODUCING A TURBINE ROTOR

BACKGROUND OF THE INVENTION

Field of the Invention

The invention relates to a process for producing a turbine rotor and also to a turbine rotor, produced by the process according to the invention.

Description of the Related Art

DE 697 24 730 T2 discloses a process for producing a turbine rotor, in which a turbine wheel and a steel shaft are connected to one another by a soldering operation. For this purpose, the turbine wheel and the shaft are heated by high-frequency induction heating, in an atmosphere of inert gas or reduction gas, to a temperature which is higher than the melting temperature of the solder metal, but does not exceed the melting temperature by 100° C. The turbine wheel and the shaft are held at this temperature in order to be able to make the connection by the soldering operation.

However, this known process has the disadvantage of a relatively high technical outlay.

In the light of this, it is an object of the present invention to provide a process for connecting a turbine wheel preferably consisting of TiAl and a shaft formed from steel which requires a lower technical outlay. Furthermore, it is an object to provide a turbine rotor as per the preamble of claim 6 which has a simple construction and makes it possible to achieve a secure connection between the turbine wheel and the shaft.

BRIEF SUMMARY OF THE INVENTION

According to the invention, it is possible to achieve a defined diffusion zone in the turbine wheel and on the shaft (steel shaft) when connecting the turbine wheel and shaft by the electron beam soldering. For this purpose, the introduction of heat into the respective material of the turbine wheel or of the shaft is precisely controlled.

The electron beam/solder beam (EB beam) is preferably divided in such a way that it alternately moves over the respective temperature windows on each of the joining partners (turbine wheel/steel shaft).

In this respect, the joining partners are preferably turned uniformly at a defined rotational speed at the same time during the introduction of heat.

In a particularly preferred embodiment, the connection process is carried out in the process chamber of an EB machine in vacuo.

BRIEF DESCRIPTION OF THE SEVERAL VIEWS OF THE DRAWINGS

Further details, advantages and features of the present invention become apparent from the following description of an exemplary embodiment with reference to the drawing.

The only FIGURE of the drawing shows a schematically greatly simplified illustration of a turbine rotor 1, which can be the turbine rotor of an exhaust-gas turbocharger. The turbine rotor 1 accordingly has a turbine wheel 2, which is preferably produced from titanium aluminide.

DETAILED DESCRIPTION OF THE INVENTION

As the FIGURE shows, the turbine wheel 2 is connected to a shaft, preferably a steel shaft, e.g. made of construction steel or a martensitic steel. For this purpose, the turbine rotor 1 has a connection device 8, which is in the form of an electron beam solder joint. The connection device 8 can additionally be provided with a selectable joint geometry, e.g. with a journal on a joining partner and, on the other joining partner, a recess for the insertion of the journal.

The solder joint 8 is in this case arranged between the back side 4 of the turbine wheel 2 and an end face 4' of the shaft 3, as is apparent in detail from the illustration in the FIGURE.

For illustrating the process according to the invention for producing the turbine rotor 1, an electron beam soldering machine 6 is shown by a dot-dashed line, having a process chamber 7 in vacuo. It is therefore possible to carry out the electron beam soldering process symbolized by the arrow 5 in vacuo, in which case the EB beam 5 can be divided in such a way that it alternately moves over the respective temperature windows of the joining partners 2, 3.

As mentioned in the introduction, the joining partners formed by the turbine wheel 2 and the shaft 3 are subjected to defined uniform turning during the soldering operation.

In addition to the above written disclosure of the invention, reference is hereby explicitly made to the drawing, to supplement said written disclosure.

LIST OF REFERENCE SIGNS

1 Turbine rotor
2 Turbine wheel
3 Shaft
4 Back of the turbine wheel
4' End face of the shaft 3
5 EB beam
6 EB machine
7 Vacuum chamber
8 Connection device (solder joint)

The invention claimed is:

1. A process for producing a turbine rotor (1), which has, as joining partners, a turbine wheel (2) made of TiAl and a shaft (3) produced from steel, with the following process steps:
   providing the turbine wheel (2);
   providing a solder;
   providing the shaft (3);
   determining a TiAl soldering temperature window having a lower end at which the solder will melt and an upper temperature which is the maximum process temperature of TiAl;
   determining a steel soldering temperature window having a lower end at which the solder will melt and an upper temperature which is the maximum process temperature of steel;
   contacting the turbine wheel (2) to the shaft (3) with said solder between turbine wheel (2) and shaft (3); and
   moving an electron beam (5) alternately over the TiAl turbine wheel (2) and the steel shaft (3) to raise the temperature of the TiAl turbine wheel (2) at the solder to within the TiAl soldering temperature window and simultaneously raise the temperature of the steel shaft (3) at the solder to within the steel soldering temperature window, wherein the joining partners (2, 3) are turned at the same time during said soldering.

2. The process as claimed in claim 1, wherein the vacuum is generated in a process chamber (7) of an EB machine (6).

3. The process as claimed in claim 1, wherein the electron beam soldering is carried out with a copper based solder.

4. The process as claimed in claim 1, wherein the electron beam soldering is carried out with a titanium based solder.

\* \* \* \* \*